United States Patent Office 3,510,216
Patented May 5, 1970

3,510,216
PROJECTION APPARATUS
Irwin Wagman, Rochester, N.Y., assignor to Xerox Corporation, Rochester, N.Y., a corporation of New York
Filed Dec. 27, 1966, Ser. No. 605,007
Int. Cl. G03b 21/00, 21/28, 33/00
U.S. Cl. 353—32      3 Claims

ABSTRACT OF THE DISCLOSURE

Projection apparatus for exposed lenticular photoreceptors wherein collimated white light is subdivided into light of primary colors with dichroic mirrors. This colored light is then focused by the lenticules associated with the film to provide a full color display.

BACKGROUND OF THE INVENTION

The desirability of full color displays of informational data descriptive of a situation contemporaneously with the occurrence of events which affect this situation has been well accepted.

One method which satisfies the requirements of such a display involves the three color additive lenticular process. This process is based on a uniform array of microscopic cylindrical lenses or lenticules embossed transversely into a monochromatic film base. Each of these tiny lenses is focused on a three-color banded filter disposed in the aperture of an objective lens. Thus a series of reduced images of the three color bands of the filter is formed by the cylindrical lenses on the photosensitive layer of the film. All the light coming through the objective lens must pass through the filter. The light rays are then separated according to color and fall in discrete lines to expose the monochromatic photoreceptor.

In order to display the images recorded on the photoreceptor, the recording process is simply reversed. In this way, white light is passed through the exposed bands of the photoreceptor and is focused by the tiny cylindrical lenses onto respective bands of a banded color filter. The light passing through this filter is then refocused into tiny bands of colored light at the display screen. The observer's eye then integrates the superimposed minute color sensations to perceive a resultant color.

The aforedescribed prior art projection system has several disadvantages which make it unsuitable for various applications.

The heat generated by the white light source is detrimental to the photosensitive film and, therefore, greatly reduces film life unless expensive, heat resistant film is utilized.

Because banded color filters are absorptive, the white light source's energy is not totally transmitted to the display screen resulting in a significant loss in brightness which is undesirable in certain display environments.

SUMMARY OF THE INVENTION

Therefore, it is an object of the present invention to improve lenticulated film projection.

It is a further object of the present invention to provide a novel lenticulated film projection wherein the photosensitive layer of film is exposed to a minimum amount of heat.

Additionally, it is an object of the present invention to provide a novel lenticulated film projection by which a display of maximum brightness is possible.

These and other objects which may become apparent are accomplished in accordance with the principles of the present invention wherein collimated white value is subdivided into light of primary colors with dichroic mirrors. This colored light is then focused by the lenticules associated with the film to provide a full color display.

BRIEF DESCRIPTION OF THE DRAWING

For a better understanding of the present invention as well as other objects and features thereof, reference may be made to the following description of the invention to be read in connection with the accompanying drawings wherein.

DESCRIPTION OF THE PREFERRED EMBODIMENT

Figure 1:
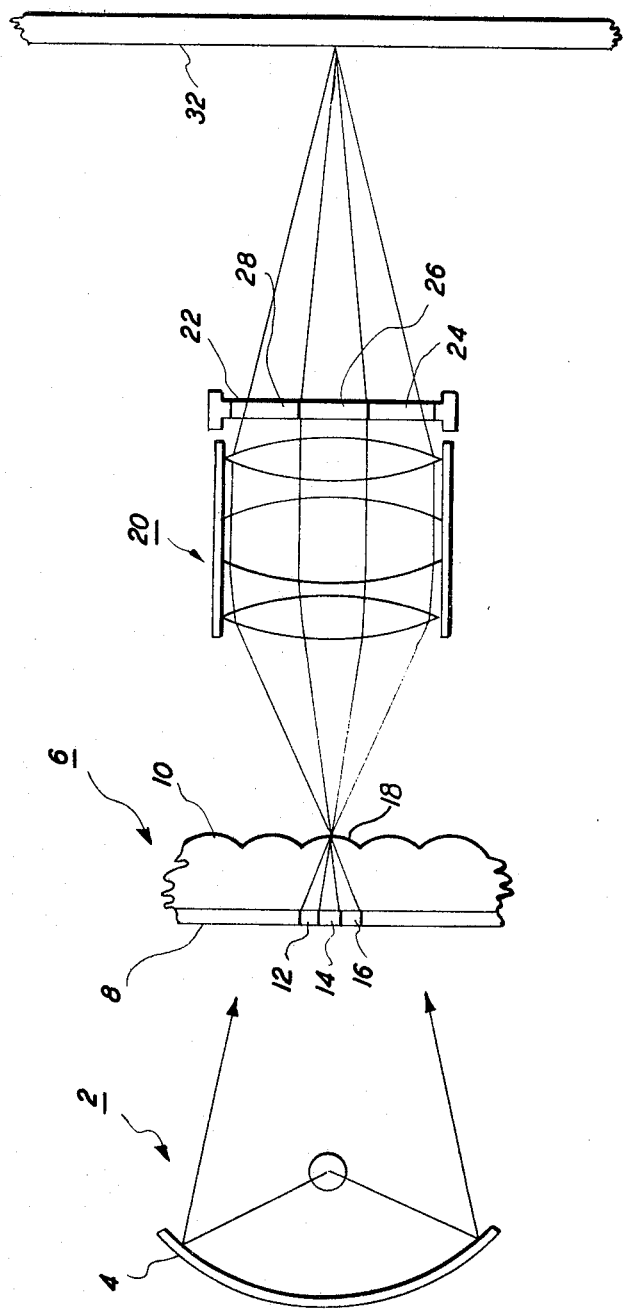
FIG. 1 illustrates a prior art projection system; and,
FIG. 2 illustrates a preferred embodiment of the present invention.

Referring in more detail to FIG. 1, white light from a source generally designated by the reference numeral 2 is directed by a reflector 4 toward a lenticulated film member 6 which includes an exposed and developed photosensitive film layer 8 and a transparent lenticulated base member 10. For purposes of illustration, the photosensitive layer 8 is shown as having three exposed bands 12, 14, and 16. The white light passing through the portion of the layer 8 including these three bands is intensity modulated in accordance with the modulation of exposure to which each of these three bands was subjected. This modulated light passing through the three bands 12, 14, and 16 is then focused by the lens action of the lenticule 18 associated with these bands and a projection lens 20 in such a manner as to direct the modulated light through corresponding bands of a banded filter 22. This results in the light modulated by band 12 passing through color band 24, the light from bands 14 and 16 passing through color bands 26 and 28, respectively. At the exit side of the color filter 22, the light modulated by the bands 12, 14, and 16 on the photosensitive layer 8 is now colored in accordance with the particular color characteristic of the filter band through which it was directed by lenticule 18 and lens 20 and is focused at a point on a suitable display screen 32 resulting in a composite colored image of the three bands 12, 14, and 16 as seen by an observer.

As hereinabove mentioned, this prior art projection system exposes the film layer 8 to excessive and detrimental heat from the light source 2 since this film layer 8 is facing the light source. In addition, after the projection light is intensity and color modulated by the film layer 8 and energy absorptive color filter 22, it has lost a significant amount of energy thereby reducing considerably the brightness of the final display at the screen 32.

Figure 2:
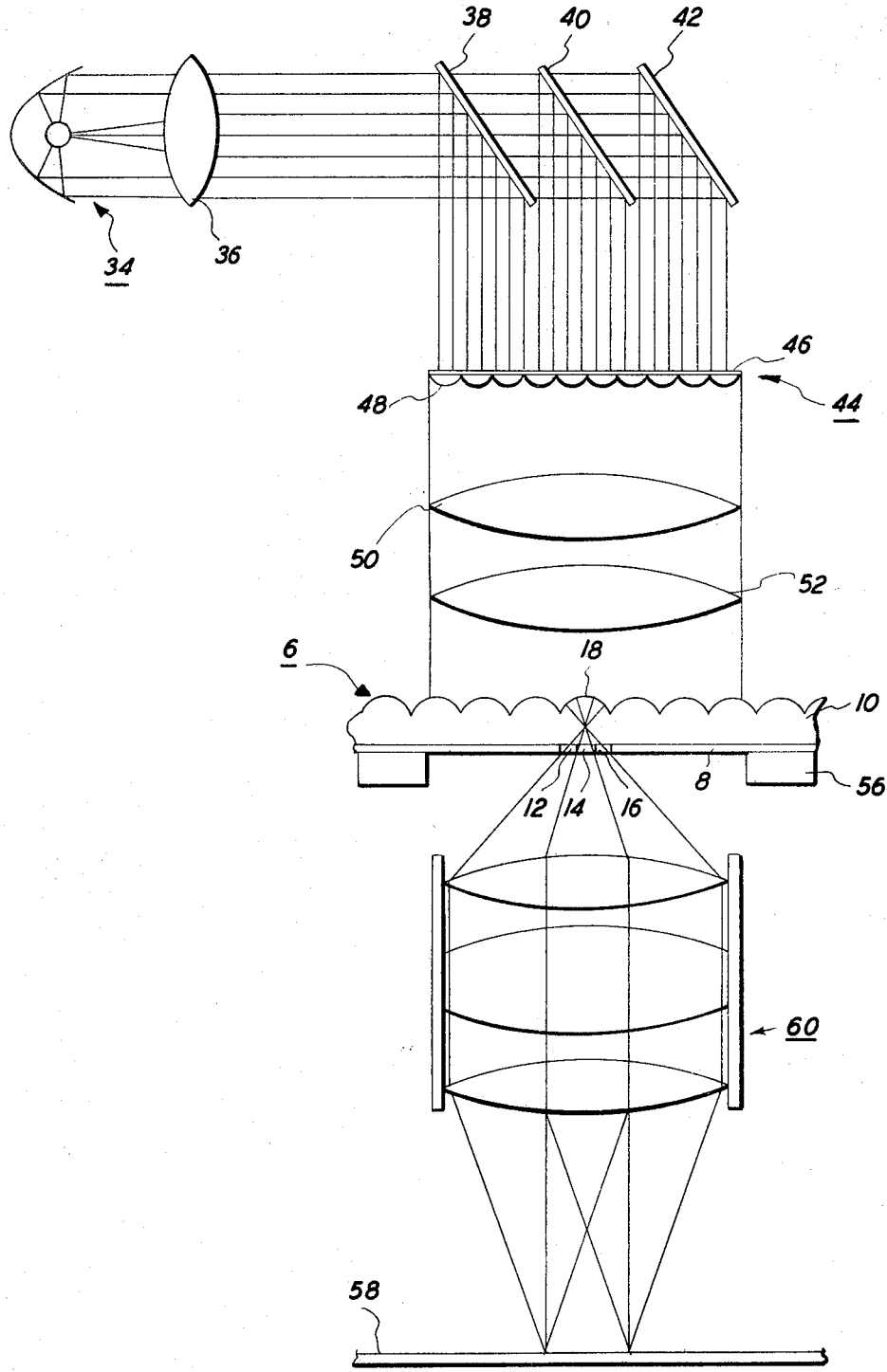

Referring now to FIG. 2 which illustrates a preferred embodiment of the present invention, it will become clear how the concept of the present invention eliminates the aforementioned disadvantages.

A source of white light, generally designated by the reference numeral 34, is directed in a collimated ray via a collimator lens 36 to a dichroic mirror 38 which, for example, reflects light of one primary color and transmits the remaining light to a second dichroic mirror 40. Mirror 40 reflects light of another primary color and transmits the remaining light to a front surface mirror 42 which reflects the total remaining light. For purposes of explanation, the parallel mirrors 38, 40, and 42 may reflect light of red, blue, and green color in a direction substantially perpendicular to the direction of the light passing through collimator lens 36. The spacing of the mirrors 38 and 42 relative to each other is preferably such that the total light reflected by all three mirrors will illuminate the area occupied by a composite lens 44, generally referred to as a pebble bed lens. This pebble bed lens can be described as a thin glass plate 46 having suitably adhered to one surface thereof a regular array of immediately adjacent spherical lenses having the characteristics such that each individual spherical lens acts on the light reaching it through the glass plate 46 in cooperation with two conventional telecentric lenses 50 and 52 to effectively project this light substantially over the entire area of a portion of lenticulated film 6 which is coextensive with and uniformly spaced from the pebble bed lens 44. The spherical lenses of the pebble bed lens 44 are of substantially equal power.

A conventional film gate or other suitably apertured support member 56 serves to support and position that portion of the lenticulated film 6 which is to be projected onto a display screen 58. The relative positions of the pebble bed lens 44, the telecentric lenses 50 and 52, and the lenticules of the lenticulated film are such that these lenticules focus on the pebble bed lens to direct the colored light coming from this lens 44 onto the particular band on the film layer with which the particular color of light is associated. In this manner, a conventional projection lens assembly 60 focuses the light passing through the film 6 onto the screen 58 to reconstitute the original image recorded on the lenticulated film 6. This reconstituted image will be a full color display formed by a subjective composite of light of the three primary colors determined by the dichroic mirrors 38, 40, and 42, intensity modulated by the exposed bands 12, 14, and 16 on the film 6.

By the arrangement of FIG. 2, it may readily be seen that light energy loss is very little relative to the loss in the prior art system of FIG. 1. In addition, in FIG. 2, the lenticulated portion 10 of the film 6 and not the photosensitive layer 8 is exposed to any detrimental heat generated by the light source 34 thereby enhancing film longevity.

In summary, therefore, the present invention provides an improved projection light source for exposed lenticular photoreceptors which overcome many of the disadvantages of the prior art. As was seen in FIG. 1 which represents the prior art, the photoreceptor is directly exposed to the detrimental heat generated by the white light source. This not only reduces the life of an inexpensive film, but would necessitate expensive film which is more heat resistant in those situations where reusability of the film was desired.

In addition, by subjecting that light modulated by the exposed bands of information on the film layer through the bands of a colored filter, significant amounts of light energy are absorbed. This would result in an undesirable display which lacks the brightness required by many display environments, e.g., high ambient light.

The present invention as illustrated in the embodiment of FIG. 2 overcomes these two important and significant disadvantages in the prior art by providing a projection system which finds the lenticulated base member between the light source and the heat sensitive film layer thereby serving to absorb significant amounts of the detrimental heat originating in the light source.

In addition, by using the dichroic mirror arrangement to separate the light originating from the white light source into light of the primary colors the absorbing filter is eliminated thereby maintaining maximum brightness in the final display.

While the invention has been described with reference to the arrangement disclosed herein, it is not confined to the details set forth since it is apparent that equivalent components may be substituted for the components of the preferred arrangement without departing from the scope of the invention. Thus, for example, while a plurality of conventional projection lenses are illustrated, other arrangements of conventional lenses may be substituted to perform the same function.

In addition, while the pebble lens in the embodiment of FIG. 2 may utilize four spherical lenses per square inch of the support plate, it would be apparent to one skilled in the art that other spherical lens arrangement may be used without departing from the concept of the present invention. For example, the spherical lens density on the thin support plate may be varied as long as the desired result of focusing the individual primary colored light beams from the dichroic mirrors onto that area of the lenticulated film to be projected is accomplished.

Red, blue, and green colored light has been specified in the description hereinabove for purposes of description and explanation only. It will be apparent to one skilled in the art that other colors may be utilized which will form an additive color image on a display screen and these colors may preferably correspond to the colors utilized in the original film recording.

In addition, while dichroic mirrors have been described for separating the light from the white light source into primary colored light, it is well known that other conventional optical assemblies, such as prisms, may be used to provide this colored light separation. Such arrangements would be compatible with the concept of the present invention.

Therefore, it is the intention of the applicant to cover such modifications or changes as may come within the scope of the invention as defined by the following claims:

What is claimed is:

1. A projection apparatus comprising:
 (a) a source of collimated white light;
 (b) an information bearing member having two surfaces, one surface being a photosensitive member and the other surface being a transparent cylindrically lenticulated member, said information bearing member being spaced from said source with said other surface being more nearly adjacent thereto than said one surface, said photosensitive member having a plurality of exposed and developed monochromatic information areas in strip configuration aligned with a lenticule of said lenticulated member;
 (c) first optical means spaced between the source and information bearing member realtive to said source for effectively dividing said white light into a plurality of collimated light beams, each associated with a particular primary color, said first optical means including a plurality of parallel dichroc mirrors angularly disposed relative to said white light and said two surfaces of said information bearing member;
 (d) second optical means spaced intermediate said first optical means and said information bearing member for focusing said plurality of collimated light beams substantially over the area of said other surface, said second optical means including a transparent plate supporting on one surface thereof a plurality of unimeans including a plurality of parallel dichroic mirform and equally spaced apart spherical lenses and at least one telecentric lens, said spherical lenses being on the remote side of said plate relative to said first optical means and on the near side of said plate relative to said telecentric lens;
 (e) a display screen; and
 (f) a projection lens assembly intermediate said display screen and said information bearing member and in cooperable relation therewith.

2. A projection apparatus comprising:
 (a) a source of collimated white light;
 (b) first optical means spaced relative to said source for effectively dividing said white light into a plurality of collimated light beams, each associated with a particular primary color;
 (c) an information bearing member having two surfaces, one surface being a developed photosensitive member and the other surface being a transparent cylindrically lenticulated member, said information bearing member being spaced from said first optical means with said other surface being more nearly adjacent thereto than said one surface;
 (d) second optical means spaced intermediate said first optical means and said information bearing member for focusing said plurality of collimated light beams substantially over the area of said other surface, said second optical means including a transparent plate supporting on one surface thereof of a plurality of uniform and equally spaced apart spherical lenses, said spherical lenses being on the remote side of said plate relative to said first optical means;

(e) a display screen; and, (f) a projection lens assembly intermediate said display screen and said information bearing member and in cooperable relation therewith.

3. A projection apparatus comprising:

(a) a source of collimated white light;

(b) an information bearing member having two surfaces, one surface being a transparent cylindrically lenticulated member and the other surface having a plurality of exposed and developed monochromatic information areas in strip configuration aligned with each lenticle of said lenticular member, said lenticular surface of the information bearing member being on the near side of said information bearing member relative to said source;

(c) first optical means spaced realtive to said source for effectively dividing said white light into a plurality of collimated light beams each associated with a particular primary color, said optical means including a plurality of parallel dichroic mirrors angularly disposed relative to said white light and said two surface of said information bearing member;

(d) second optical means spaced intermediate said first optical means and said information bearing member for focusing said plurality of collimated light beams substantially over the area of the surface, said second optical means including a transparent plate supporting on one surface thereof a plurality of uniform and equally spaced apart spherical lenses and at least one telecentric lens, said telecentric lens being positioned between the transparent plate and spherical lenses and information bearing member;

(e) a display screen; and (f) a projection lens assembly intermediate said display screen and said information bearing member and in cooperable relation therewith.

References Cited

UNITED STATES PATENTS

| 1,762,932 | 6/1930 | Mihalyi. | |
| 1,939,785 | 12/1933 | Luboshez | 352—81 |
| 1,991,670 | 2/1935 | Heymer. | |
| 2,072,741 | 3/1937 | Eggert et al. | |
| 2,183,305 | 12/1939 | De Lassus Saint Genies | 352—67 |
| 2,604,813 | 7/1952 | Gretener. | |
| 2,950,644 | 8/1960 | Land et al. | 352—81 |

NORTON ANSHER, Primary Examiner

R. M. SHEER, Assistant Examiner

U.S. Cl. X.R.

350—167; 352—66; 353—99

UNITED STATES PATENT OFFICE
CERTIFICATE OF CORRECTION

Patent No. 3,510,216              Dated May 5, 1970

Inventor(s) Irwin Wagman

It is certified that error appears in the above-identified patent and that said Letters Patent are hereby corrected as shown below:

IN THE CLAIMS:

Claim 1, Column 4, Line 51, delete entire line "means including a plurality of parallel dichroic mir-"

Claim 3, Column 5, Line 29, "surface" should read --surfaces--.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents